L. BRUN.
REVERSIBLE ROTARY MOTOR.
APPLICATION FILED FEB. 15, 1912.
1,048,468.
Patented Dec. 24, 1912.
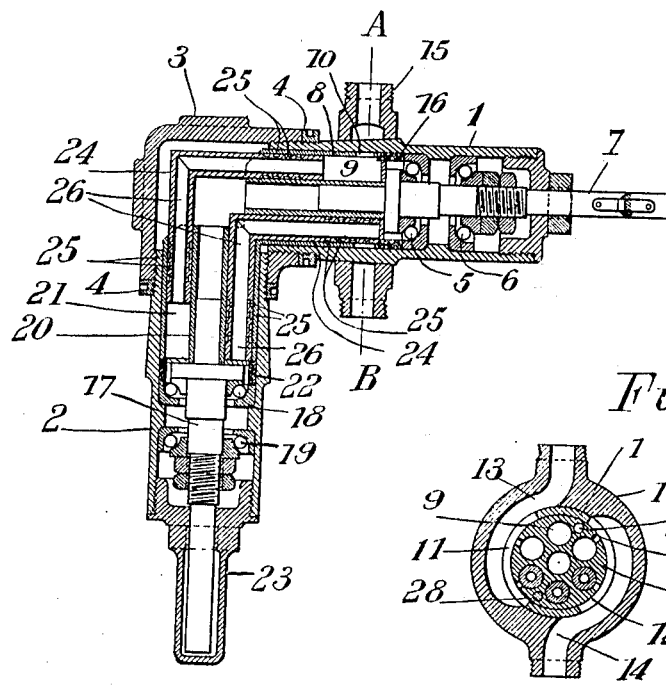
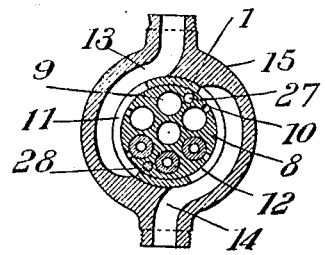
Witnesses:
Inventor:
Louis Brun
Attorney.

UNITED STATES PATENT OFFICE.

LOUIS BRUN, OF ST. CHAMOND, FRANCE.

REVERSIBLE ROTARY MOTOR.

1,048,468. Specification of Letters Patent. Patented Dec. 24, 1912.

Original application filed August 1, 1911, Serial No. 641,842. Divided and this application filed February 15, 1912. Serial No. 677,835.

*To all whom it may concern:*

Be it known that I, LOUIS BRUN, a citizen of the French Republic, and resident of St. Chamond, France, have invented certain new and useful Improvements in Reversible Rotary Motors, of which the following is a specification.

This invention relates to improvements in motors and forms a division of my application for Patent, No. 641,842, filed August 1, 1911.

The object of the present invention is to provide means for converting reciprocating motion into rotary motion by providing two angularly disposed driven elements with interposed angular, hollow, driving elements, and operate the latter by fluid or other pressure admitted and exhausted through one end of the same.

The invention also relates to the specific details of construction and arrangement of parts which will be hereinafter described and particularly pointed out in the claims.

In the drawings: Figure 1 is a central vertical section of my improved motor. Fig. 2 is a transverse section on the line A—B, Fig. 1.

A suitable casing incloses the operating mechanism and comprises an elbow 3, in the ends of which horizontal and vertically disposed cylindrical members 1 and 2 respectively, are screwed. This construction forms a right angle, as clearly shown in Fig. 1. Jam nuts 4, fit against the ends of the elbow 3, to bind the parts of the casing together. In the cylindrical member 1, is fitted to rotate a cylindrical driver element 8, formed with a plurality of bores 9. Communicating with the bores 9, are ports 10, designed to register with inlet and outlet ports 11 and 12 formed in the cylindrical member 1. Surrounding the cylindrical member 1 adjacent ports 11 and 12 is a casing 15 provided with an inlet passage 13, which communicates with the inlet port 11 and an outlet passage 14 which communicates with the outlet port 12 as shown in Fig. 2. Back of the driven element 8 and fitting against a shoulder formed in the cylindrical member 1 is a ball bearing 5 which with a similar bearing 6 supports a power shaft 7. Suitable resilient packing, indicated at 16, is interposed between the driven element 8 and the flange of the ball bearing 5.

A vertically disposed driven element 25 is housed in the cylindrical member 2, and is mounted on a shaft 17. The shaft is mounted in ball bearings 18 and 19, and between the flanges of the former and the cylindrical element 20, is interposed suitable resilient packing indicated at 22. The adjacent ends of the driving elements abut, and are held in this position by the resilient packings 16 and 22. The cylindrical element 20, is formed with vertical bores 21, corresponding in number to the number of bores in the cylindrical element 1. Fitting in corresponding bores in the cylindrical elements 1 and 2, are hollow driving elements 24, the passage 26 in each driving element extending from end to end to afford communication with the respective bores. Each driving element is provided with packing rings 25, located near the ends to form a tight joint with the walls of said bores.

In operation, the motive fluid enters the inlet passage 13, thence through the inlet port 11 and through the ports 10 to such of the bores 9 which are in registry with the inlet port 11. In this connection it will be observed by reference to Fig. 2, that port 11 is of such width as will admit motive fluid to at least two of the bores 9. As the motive fluid passes into bores 9, it flows through the hollow driving elements and into the cylindrical element 20, and the pressure executed between the bottom of the latter and the horizontal portions of said driving element will force the latter out from said cylindrical element and thereby act to rotate the driven cylindrical element 8. The pressure of the motive fluid between the end of the cylindrical element 8, and the vertical portion of the driving elements 24 tend to force the latter out hence, such pressure acts to rotate the cylindrical element 20, in unison with the rotation of the cylindrical element 8. The two reciprocating movements imparted by the presence of the motive fluid serve to impart the same speed to the cylindrical elements 8 and 20, and when the driving elements have reached the limit of their reciprocating movement due to the arc of the circle described by the movement of the cylindrical elements, the parts are so turned that the supply of motive fluid will be cut off from the uppermost bores in the cylindrical element 8. Then, upon further movement of the cylindrical element 8, the ports 10 register with the port 12, and the previously introduced motive fluid exhausts through the exhaust passage 14, and the driving elements will as the motor combines to rotate, be returned to position to receive at the proper time, another charge.

By the construction described, fluid is admitted to but one of the cylindrical driven elements, while the pressure exerted by such fluid simultaneously acts in both said cylindrical driven elements to rotate the same through the medium of the driving elements. Obviously by admitting the motive fluid through the passage 14, the shaft 7, will rotate in an opposite direction to that previously described, the operation of the parts being substantially the same, except that the driving elements 20, on the left (viewing Fig. 2) will be forced out by the pressure.

What I claim is:

1. A motor comprising two angularly disposed driven elements formed with bores, hollow angularly disposed driving elements fitting in the bores and means for admitting and exhausting motive fluid through the bores to reciprocate the driving elements, whereby to rotate the angularly disposed driven element.

2. A motor comprising an angular casing formed with inlet and outlet ports, two driven cylindrical elements mounted to rotate in the angular casing and formed with bores, one of said driven elements having inlet and outlet ports adapted to register with the inlet and outlet ports in the casing, hollow angular shape driving elements fitting in the bores of the driven elements, whereby when fluid pressure is admitted to the ports in the driven element, it will pass through the driving elements to the other driven element and cause both driven elements to rotate.

3. A motor comprising a horizontal driven element formed with a plurality of bores having communicating ports, a shaft on which the horizontal driven element is mounted, ball bearings for said shaft, means for introducing and exhausting motive fluid through said ports, a vertical driven element formed with a plurality of bores, a shaft on which the vertical driven element is mounted, ball bearings in which the vertical shaft is mounted, a plurality of hollow angular shape driving elements, the ends of which fit in the bores of the horizontal and vertical driven element to form communication with the respective bores, packing interposed between the ends of the driving elements and the walls of the bores, whereby when motive fluid is admitted in the ports, it will pass through the driving elements and reciprocate same and simultaneously rotate the driven elements.

4. A motor comprising two driven elements formed with bores, hollow driving elements connecting the bores, and means for introducing motive fluid to one of the driven elements, said motive fluid passing through the hollow driving elements to the companion driven element whereby the driving elements will be reciprocated in two directions and simultaneously rotated with the rotation of the driven elements.

5. A motor comprising an angular casing, a flange in each arm of the angular casing, a horizontal driven element mounted in the casing and formed with horizontal bores, resilient packing interposed between the horizontal driven element and one of the flanges, a vertically disposed driven element in the other arm of the casing, said vertical driven element having bores, a flange in said other arm of the casing, resilient packing interposed between the latter flange and the vertical driven element, angular shape hollow driving elements communicating with the bores in the horizontal and vertical driven elements, and means for admitting motive fluid to one of the driven elements to reciprocate the driving elements in two directions and thereby rotate both driven elements.

In testimony whereof I have hereunto set my hand in presence of two witnesses.

LOUIS BRUN.

Witnesses:
H. TASEAL,
EDMOND A. BURRILL.